Figure 1:
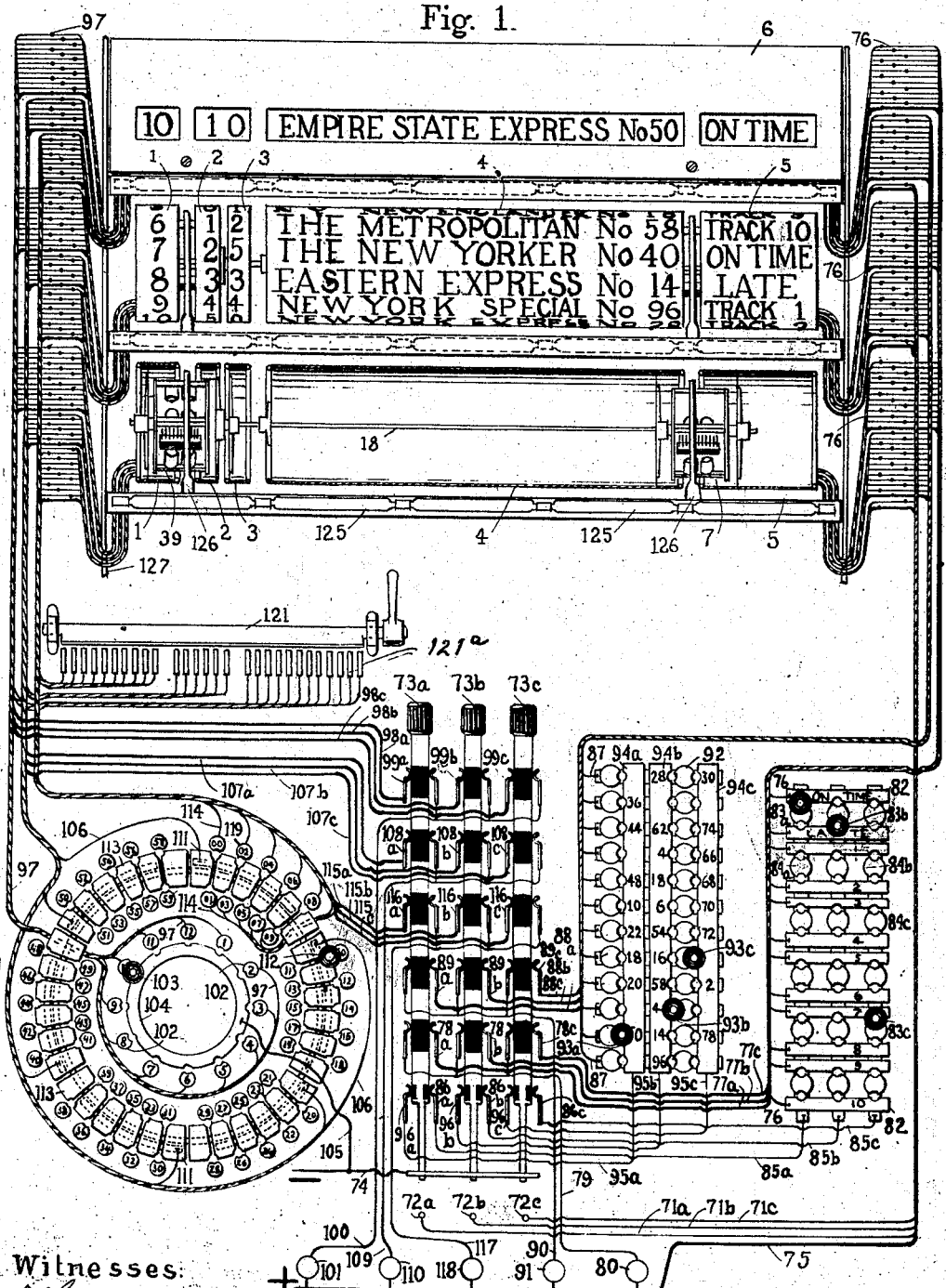

S. W. BALCH.
TRAIN BULLETIN.
APPLICATION FILED SEPT. 7, 1912.

1,195,900. Patented Aug. 22, 1916.
5 SHEETS—SHEET 1.

Witnesses:
Thomas Turney Jr
Frank C. Cole

Inventor,
Samuel W. Balch

S. W. BALCH.
TRAIN BULLETIN.
APPLICATION FILED SEPT. 7, 1912.
1,195,900.
Patented Aug. 22, 1916.
5 SHEETS—SHEET 2.
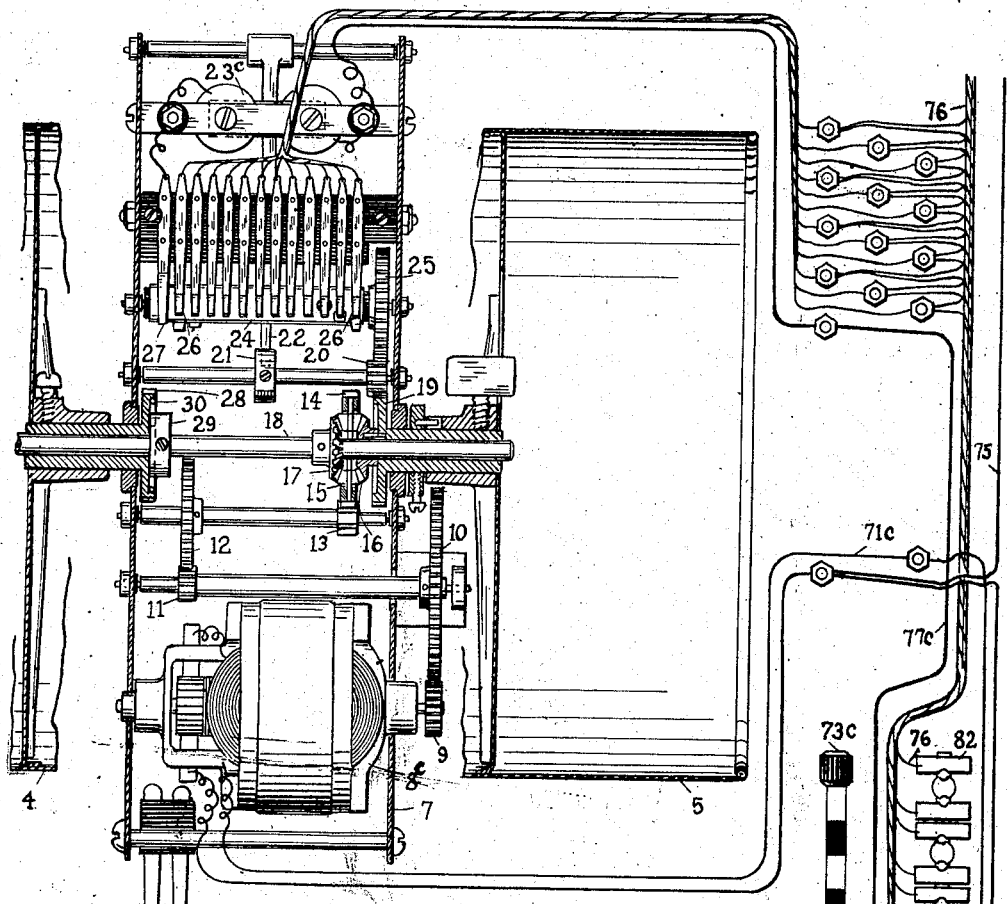
Fig. 2.
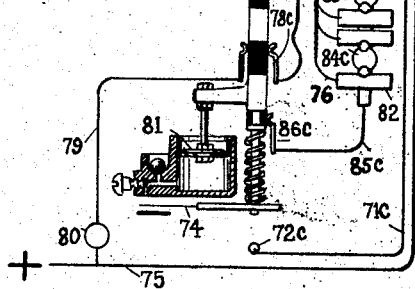
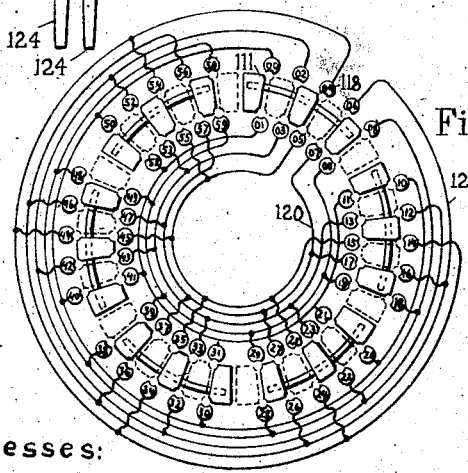
Fig. 3.
Witnesses:
Inventor,
Samuel W. Balch

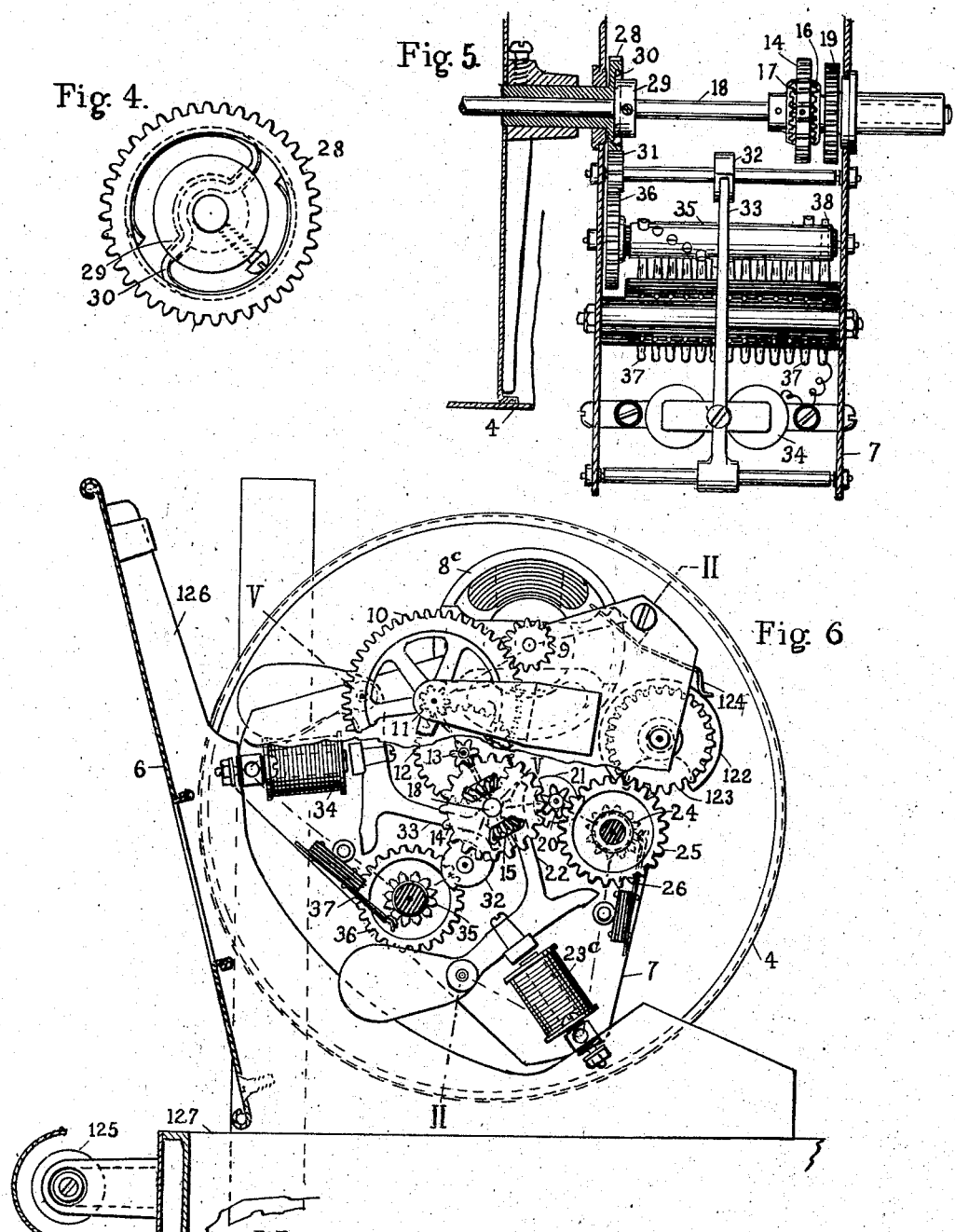

S. W. BALCH.
TRAIN BULLETIN.
APPLICATION FILED SEPT. 7, 1912.

1,195,900.

Patented Aug. 22, 1916.
5 SHEETS—SHEET 5.

Witnesses:
Thomas Ewing Jr.
Frank C. Cole

Inventor,
Samuel W. Balch

UNITED STATES PATENT OFFICE.

SAMUEL W. BALCH, OF MONTCLAIR, NEW JERSEY.

TRAIN-BULLETIN.

1,195,900.

Specification of Letters Patent.  Patented Aug. 22, 1916.

Application filed September 7, 1912. Serial No. 719,233.

*To all whom it may concern:*

Be it known that I, SAMUEL W. BALCH, a citizen of the United States of America, and a resident of Montclair, in the county of Essex and State of New Jersey, have invented certain new and useful Improvements in Train-Bulletins, of which the following is a specification.

The object of this invention is to provide a bulletin consisting of a plurality of units for conveying information, each unit having two or more indicating elements on which the items of information are placed and from which these items are selected and combined in any desired manner electrically from a distant board.

A further object is to provide a system which will indicate at the operating board as each element is properly set in response to the signal sent by the operator.

A further object is to provide a bulletin suitable for rapid setting and display of information in large letters carried by the moving parts which may have considerable weight.

A further object is to utilize a single driving mechanism for the several elements of a unit and to operate them simultaneously, and by smooth continuous movement.

A further object is to so combine the circuits that the same connecting wires between the bulletin and the operating board may in large part be used in connection with each of the units.

A further object is to provide a system in which the indication for each unit may remain set at the operating board while the same connecting wires are being used for setting indications of other units.

A further object is to provide for determining the position of two indicating elements in all permutations by the setting of a single plug at the operating board.

A further object is to provide a compact and accessible arrangement of the elements of the bulletin.

The invention has been devised for the particular and exacting service of giving information at railway stations of arriving and departing trains, but I do not confine the invention to this service as it may be used for other purposes where a multiplicity of elements, each of which has a number of positions, require to be set to any combination of positions, and I do not confine my invention to applications where the elements give their indication directly and visually.

Figure 7:
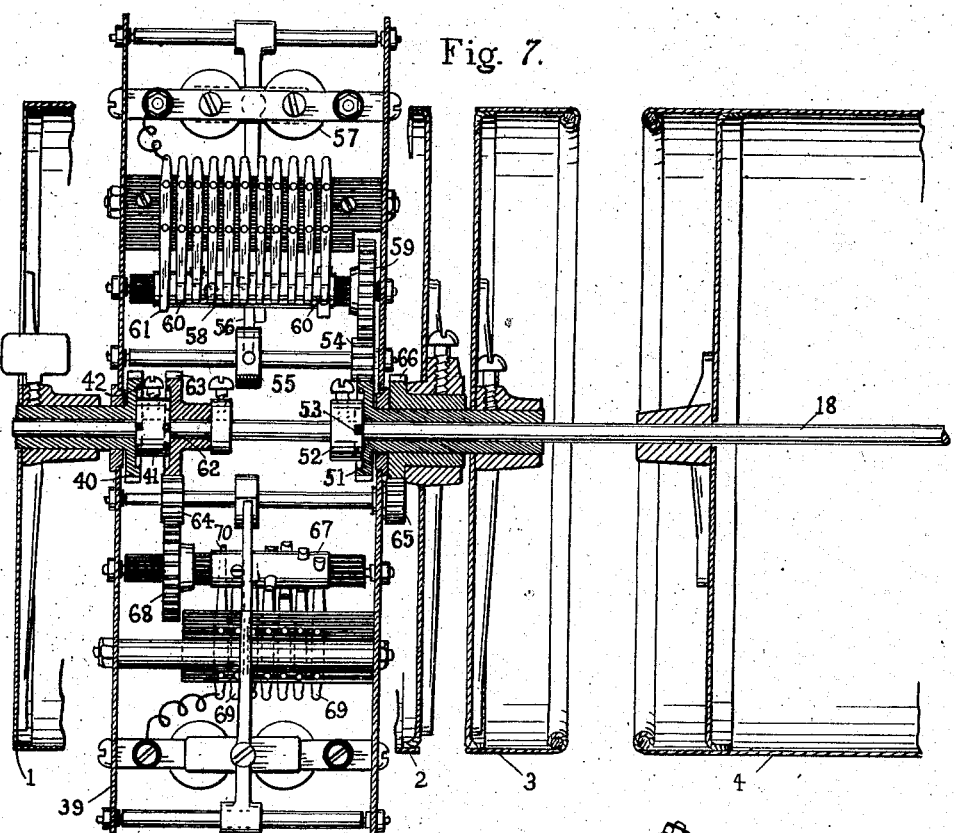
Figure 8:
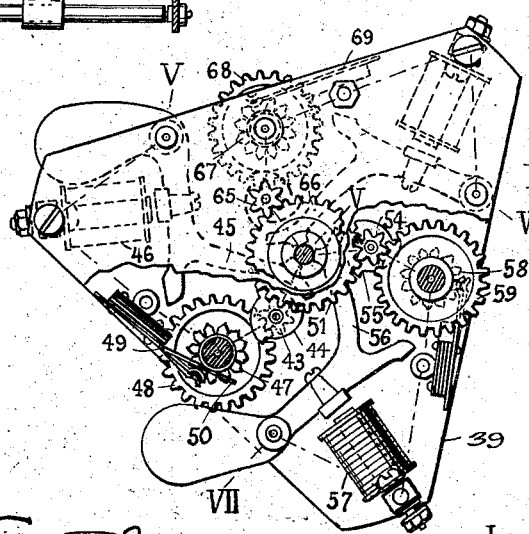
Figure 9:
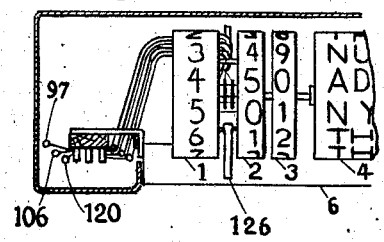
Figure 10:
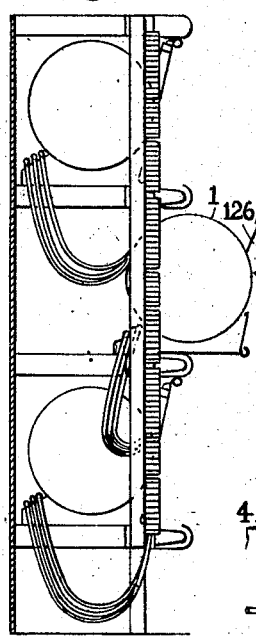
Figure 12:
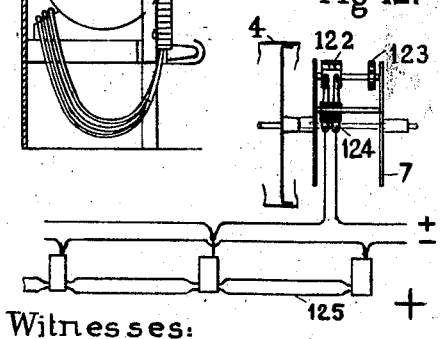
Figure 11:
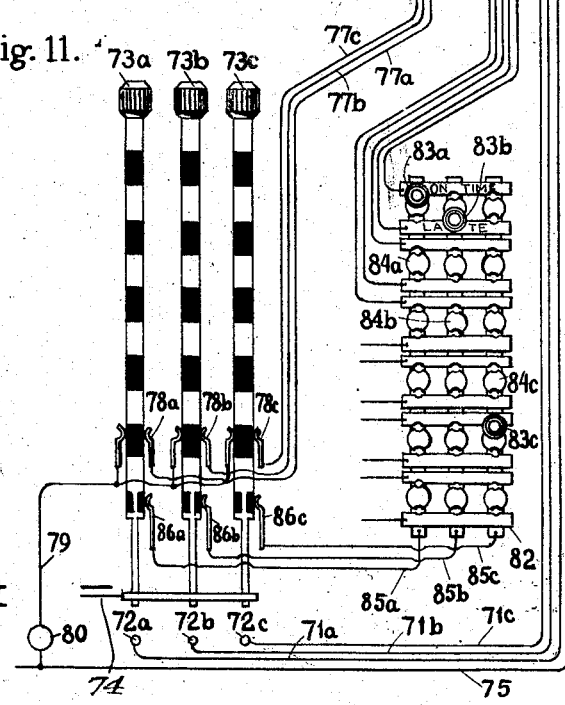

In the accompanying five sheets of drawings which form a part of this application Figure 1 is a general view of the apparatus. Fig. 2 is a section through the right mechanism frame of an indicating unit on the line II—II of Fig. 6 showing the driving mechanism, track indicating drum, positioning mechanism for this drum and the circuits therefor. Fig. 3 is a view of the operating board contacts for the ten-minute and unit-minute drums showing interconnections. Fig. 4 shows the friction drive for the time and train indicator elements. Fig. 5 is a section through either mechanism frame on the line V—V of Figs. 6 or 8 showing positioning mechanism which is the same for both the hour indicating drum and the train indicating drum. Fig. 6 is a side elevation of the right frame broken away showing the driving mechanism, and the positioning mechanisms for the track and train indicating drums. Fig. 7 is a section through the left mechanism frame on the line of VII—VII of Fig. 8 showing the positioning mechanism for the ten-minute and the unit-minute indicating drums. Fig. 8 is a side elevation of the left frame broken away showing the positioning mechanisms for the hour, ten-minute and unit-minute indicating drums. Fig. 9 is a horizontal section through the left end of the cabinet in which the indicating apparatus is mounted. Fig. 10 is a vertical section through the left end of the cabinet with one of the units drawn out for inspection. Fig. 11 is a diagram of the circuits for operating like indicating elements of three units. Fig. 12 is a diagram of a lighting circuit.

The bulletin comprises a plurality of units each giving an independent line of information and consisting of five indicating elements, each of which is a drum with spaces for twelve lines of information. These drums may be revolved and the lines combined in any permutation. There is an hour drum 1 bearing the figures 1 to 12, a ten-minute drum 2 bearing the figures 0 to 5, a unit-minute drum 3 bearing the figures 0 to 9, a train drum 4 bearing train names, and a track drum 5, for giving the location of the train or other information. All the figures are repeated on the ten-minute drum and the figures 0 and 5 on the unit-minute drum, which are most used, are repeated at ninety degree points so that these designations can always be set with less than half a revolution of the drums. In front of the drums is a plate 6 with a line of openings through which one line of each drum may be seen. The mechanisms for driving all these drums and controlling the positions of the train drum and the track drum are contained in a frame 7 which is located between and partly within these last two drums. The frame carries a driving mechanism and two positioning mechanisms one for the track drum and one for the train drum. The driving mechanism, Figs. 2 and 6, comprises a motor, $8^a$, $8^b$ or $8^c$, driving through a gear train 9, 10, 11, 12, 13, 14 a differential consisting of planet bevels 15 15 a bevel 16 connected to the track drum and a bevel 17 pinned to a shaft 18 which is the axis of all of the drums. The track drum is clamped to the hub of a gear 19 with which the differential directly connects. The gear meshes with a pinion 20 with a ratio of one to four and on the spindle with the pinion is a three tooth ratchet 21 which is stopped by a pawl 22. The gearing and adjustment is such that a ratchet tooth is brought opposite the pawl at each indicating position. The pawl is drawn into engaging position by a magnet $23^a$, $23^b$ or $23^c$, for stopping the mechanism at an indicating position. A contact cylinder 24 consisting of a brass sleeve with a group of twelve spirally disposed projecting contact pins mounted on an insulating core is revolved by a gear 25 of the same size as the gear which carries the drum and being in mesh with the same pinion revolves with it so as to bring a contact pin under one of the group of twelve contact fingers 26 26 at each indicating position. An additional finger 27, continually in contact with the sleeve, is connected with the magnet. The train drum, Fig. 5, is clamped at one end to the hub of a gear 28 which is frictionally driven from the shaft. A collar 29 clamped to the shaft has a diametrical groove on one side in which lies a spring wire 30 the ends of which bear in a groove turned in the inner side of the rim of the train-drum gear 28. The balance of the mechanism is of the same character as the mechanism for controlling the track drum and consists of a pinion 31, ratchet 32, pawl 33, magnet 34, contact cylinder 35, gear 36, group of twelve contact fingers 37 37 and additional finger 38.

At the other end of the unit is a similar frame 39 between and partly within the horn and ten-minute drums, the frame differing from the first described in that there are three symmetrically located positioning mechanisms, as shown in Figs. 7 and 8, instead of two and no driving mechanism, as the driving mechanism in the other frame also operates these positioning mechanisms through the axial shaft of the drums which runs through both frames. The mechanism for the hour drum is identical with that for the train drum and illustration in plan is not repeated. It is clamped on the hub of a gear 40 which is frictionally driven from the shaft through a collar 41 clamped to the shaft and driving through a spring wire 42. The balance of the mechanism, shown only in Fig. 8, includes a pinion 43, ratchet 44, pawl 45, magnet 46, contact cylinder 47, gear 48, group of twelve contact fingers 49 49 and additional finger 50. In plan the representation of these parts 43 to 50 is the same as of parts 31 to 38 of Fig. 5. The mechanism for the unit-minute drum, Figs. 7 and 8, has a gear 51 carrying the drum on its hub, a collar 52 clamped to the shaft, spring wire 53, pinion 54, ratchet 55, pawl 56, magnet 57, contact cylinder 58 with pins for the 0 and 5 indications repeated, gear 59, group of ten contact fingers 60 60 and additional finger 61. The mechanism for the ten-minute drum is driven from the same collar as the hour drum which has a second groove which carries a spring wire 62 engaging a gear 63 which runs free on the shaft and meshes with a pinion 64 on a spindle which extends through one wall of the frame and carries a second pinion 65 in mesh with a gear 66 which carries on its hub the ten-minute drum and runs on the hub of the gear for the unit-minute drum. The contact cylinder 67 for this mechanism has two opposite spirally disposed rows of pins six pins in each row and is revolved through a gear 68. A group of six contact fingers 69 engage with the pins and a finger 70 engages the cylinder and connects with the positioning magnet.

The motors $8^a$, $8^b$, $8^c$, Fig. 11, are connected by wires $71^a$, $71^b$, $71^c$, one of which is individual to each unit, with actuating contacts $72^a$, $72^b$, $72^c$, at the operating board which are closed by push buttons $73^a$, $73^b$, $73^c$, of which there is one for each unit, to a connection 74 to one side of the source of current. As will be seen from Fig. 2, the circuit from the contact $72^c$ is through the push-button stem, the spring supporting the push button and the plate supporting the spring to the connection 74. The leads from the other sides of the motors join in a common connection 75 with the other side of the source of current. The position contacts in the track indicator mechanism lead to the operating board through a group of twelve wires 76 76 each of which is led to a corresponding connection on the connection board of each unit, corresponding contacts being thereby connected and the same group of wires thereby serving to connect the position contacts of corresponding indicating elements of all the units with the operating board, and each can be brought into the circuit of the corresponding magnet coil of either of the units. The other leads of the magnet coils are wires 77ª, 77ᵇ, 77ᶜ, one of which is individual to each magnet. They lead to indicator selecting contacts 78ª, 78ᵇ, 78ᶜ, also closed by the push buttons at the operating board with a wire 79 through a signal lamp 80 to one side of the source of current. Each of these contacts is a sliding contact on the push button so placed that it will not open until the button fully returns while the actuating contact is arranged to open at once on the release of the button, the interval between the openings being regulated by a dash-pot 81, Fig. 2, to give the motor time to come to rest before the positioning magnet is released.

The group of wires, Fig. 11, from the position contacts of the track indicating mechanism leads to a track-indicator positioning grid of horizontal bars 82 82 at the operating board where each may be connected by plugs 83ª, 83ᵇ, 83ᶜ, with any one of a vertical row of connecting buttons 84ª, 84ᵇ, 84ᶜ, forming track-indicator position contacts in three groups. These are connected by wires 85ª, 85ᵇ, 85ᶜ, in series with corresponding normally open indicator selecting contacts 86ª, 86ᵇ, 86ᶜ, closed by the push buttons to the connection 74 to the other side of the source of current.

The operation in setting a track-indicating element is as follows: At the operating board the plug 83ᶜ is set at the desired indication and the push button 73ᶜ is depressed. This closes the magnet circuit from one side of the source of current through the signal lamp 80, wire 79, push button contacts 78ᶜ, wire 77ᶜ, magnet 23 and finger 27 as far as the contact cylinder 24 where the circuit is interrupted. From the other side of the source of current the circuit is through the connection 74, push button contact 86ᶜ, wire 85ᶜ, one of the buttons 84ᶜ of the track-indicator positioning grid, plug 83ᶜ, one of the bars 82, one of the group of wires 76 and one of the group of contact fingers 26 forming the other end of the interrupted circuit. The push button also closes the motor circuit from one side of the source of current through the connection 74, push button contact 72ᶜ, wire 71ᶜ, motor 8ᶜ and return connection 75 to the other side of the source of current. The motor runs as long as the button is depressed and the track-indicating mechanism turns until the magnet circuit is completed by a pin on the contact drum coming under the live contact finger when the magnet attracts its armature and further movement of this mechanism is arrested. The magnet current also flows through the signal lamp and thereby notifies the operator that this indicating element has reached the required position.

The circuits for the train-indicating mechanism, Fig. 1, are of the same general character. From the position contacts to the operating board is a group of twelve wires 87 87. From the magnet coils are wires 88ª, 88ᵇ, 88ᶜ to normally open indicator selecting contacts 89ª, 89ᵇ, 89ᶜ, also closed by the push buttons with a wire 90 through a signal lamp 91 to one side of the source of current. Each of the wires of the group from the position contacts leads to a horizontal row of buttons 92 92 at the operating board where each may be connected by plugs 93ª, 93ᵇ, 93ᶜ, with any one of a series of vertical bars 94ª, 94ᵇ, 94ᶜ, the whole forming a train-indicator positioning grid with train-indicator positioning contacts in three groups. The vertical bars are connected, when the push buttons are partially or wholly depressed, by wires 95ª, 95ᵇ, 95ᶜ, through contacts 96ª, 96ᵇ, 96ᶜ, to the connection 74 to the other side of the source of current. It will be noted that both the track and the train-indicator positioning grids consist of a lattice of horizontal and vertical conductors which may be connected at any point of intersection. They are differently constructed for the convenience of the operator, the bars in the one grid indicating tracks, and in the other grid each bar stands for a train-drum of an indicator unit. It is an operating condition as to each that but one plug may be set on the same bar, except as to two bars of the track grid which are used to show whether the trains are late or on time. After setting an indicator unit the plugs for the unit in these grids are left in place until the unit is changed as a memorandum for the operator of the position at which the indicator had been left. To prevent the contacts thus made from affecting the operation of other units, the contacts in series therewith are provided on the push buttons where the circuit will normally be open.

The circuits for the three time indicating mechanisms, Figs. 1 and 3, are also of the same general character except that the same groups of contacts at the operating board are used as the positioning contacts for each of the units and it is not necessary to place them in series with normally open contacts on the push buttons which cut them off from the source of current.

For the hour indicating mechanism from the position contacts to the operating board is a group of twelve wires 97 97. From the magnet coils are wires 98ª, 98ᵇ, 98ᶜ, to normally open indicator selecting contacts 99ª, 99ᵇ, 99ᶜ, also closed by the push buttons with a wire 100 through a signal lamp 101 to one side of the source of current. Each of the wires from the position contacts leads to a group of twelve buttons 102 102 at the operating board where any one may be selected for connection by a plug 103 with a contact ring 104 which is connected through a wire 105 with the other side of the source of current.

For the ten-minute indicating mechanism from the position contacts to the operating board is a group of six wires 106 106. From the magnet coils are wires 107ª, 107ᵇ, 107ᶜ, to normally open indicator selecting contacts 108ª, 108ᵇ, 108ᶜ, also closed by the push buttons with a wire 109 through a signal lamp 110 to one side of the source of current. Each of the wires of the group from the position contacts leads to one of six sets of contact segments 111 111 there being three in each set joined by a ring segment. At sixty of their corners provision is made for connecting a segment by a plug 112 with one of eighteen alternating segments 113 113 which are joined by a ring and connected through the wire 105 with the other side of the source of current.

For the unit-minute indicating mechanism from the group of position contacts to the operating board is a group of ten wires 114 114. From the magnet coils are wires 115ª, 115ᵇ, 115ᶜ, to normally open indicator-selecting contacts 116ª, 116ᵇ, 116ᶜ, also closed by the push buttons with a wire 117 through a signal lamp 118 to one side of the source of current. Each of the wires of the group from the position contacts leads to one of a group of buttons 119 119 in ten sets there being six in each set interconnected by wires 120 120. The buttons are placed opposite the junctions of the ten-minute indicator positioning segments with the alternating segments so that the setting of the plug for connecting the segments also connects a button with the other side of the source of current.

All of the contacts on the push buttons in the positioning circuits of the several indicating mechanisms are, as described in connection with the circuits of the track-indicating mechanism, so placed that they will not open until the buttons fully return and hold the positioning magnets until the motors have time to stop. The time-positioning contacts at the operating board are used for all the indicating units but as the circuits are all normally open at the push buttons the time indication will be transferred only to the indicator unit which is selected for operation by pressing its push button. The operation of setting an indicator unit consists in first placing all the plugs at the desired indications and then pressing the button which selects the unit on which the indications are to appear and holding down the button until the five signal lamps light to show that all the indicating mechanisms are properly set.

In the application of the invention illustrated for announcing arriving trains a classification of the trains will be made and each unit will be used for the announcement of a series of trains which give similar service, as such trains are widely separated in their arriving time and least likely to require concurrent announcement. As each train arrives and discharges its passengers the indicator on which it is shown will be set for the next train in the class, giving the expected time of arrival according to the information at hand, and the time may be revised and reset when necessary. Under the usual conditions of operation the track is not assigned until the train reaches the yard so that the track drum will first be used to give notice as to whether or not the train is reported on time and the track-indicating mechanism will be reset when the train reaches the yard. As in the interval the plugs will have been shifted for setting other units, and to avoid the necessity of restoring these plugs to the time of the train a time locking switch 121, Fig. 1, is provided. This switch has a wiper arm for simultaneously connecting all of the contacts 121ª. All of the three groups of wires from the positioning contacts of the three time indicating mechanisms are led to this switch and interconnected by the operation of the switch so that current will find its way at once to the positioning magnets on depression of the push button whether or not the corresponding contacts at the mechanisms and at the operating board are closed, and the drums positioned through these groups will be at once locked against movement.

In order to give warning of the approach of the train a lighting switch consisting of a commutator 122 is revolved by the track-indicating mechanism through the gear 123 and is arranged to close the circuit between two brushes 124 124 in the circut with the lamps 125 125 when this mechanism is set to show the track, so that the unit will have extra lighting and attention will be attracted to it.

The frames containing the operating mechanism for each unit are supported on brackets 126 126 which lie between the ends of the drum. The brackets also carry the front plate through which the indication is read. All the mechanical parts forming an indicating unit are thereby bound together and each unit is supported like a drawer in a cabinet 127. The connecting wires to each are looped so that any unit can be drawn out of the cabinet for inspection without breaking the electrical connections.

What I claim as new, and desire to secure by Letters Patent of the United States, is—

1. The combination of an indicating element, an operating mechanism, means for driving the mechanism, a magnet coil, a circuit therefor, means operated by the magnet coil for stopping the mechanism at any indicating position, contacts in the circuit for each position, means operating with the mechanism for closing the contacts, an operating board, a connection from each contact to the operating board, means at the operating board for controlling the driving means and bringing a contact connection into the coil circuit, and a signal device operated by the coil circuit at the operating board.

2. The combination of an indicating element, an operating mechanism, a motor, a friction drive between the motor and mechanism, a magnet, a circuit therefor, means operated by the magnet for stopping the mechanism at any indicating position, contacts in the circuit for each position, means operating with the mechanism for closing a contact at each position, an operating board, a connection from each contact to the operating board and means at the operating board for controlling the driving means and bringing a contact connection into the magnet circuit.

3. In an electric indicating system, an operating board bearing a plurality of indicator selecting contacts, and a group of indicator position contacts, means for closing one of the indicator selecting contacts to one side of the current source and one of the indicator position contacts to the other side of the current source, a bulletin having a plurality of indicating elements, each element having a like operating mechanism, means for driving the mechanism, a magnet coil, a circuit therefor connected with an indicator selecting contact, means operated by the magnet coil for stopping the mechanism at any indicating position, contacts in the circuit for each position connected with corresponding contacts of the other elements at the bulletin, and a connection from each of the corresponding contacts to a position contact at the operating board.

4. In an electric indicating system, an operating board having a plurality of indicator selecting contacts, a group of indicator position contacts, and means for closing one of the indicator selecting contacts to one side of the current source and one of the indicator position contacts to the other side of the current source, a bulletin having a plurality of indicating elements, each element having an indicator mechanism, means for driving the mechanism, a magnet, a circuit therefor connected with an indicator selecting contact, means operated by the magnet for stopping the mechanism at any indicating position, contacts in the circuit for each position connected with corresponding contacts of the other elements at the bulletin, and a connection from each of the corresponding contacts to a position contact at the operating board.

5. In an electric indicating system, an operating board having two or more groups of indicator position contacts, an indicator actuating contact, and means for closing a position contact in each group to the current source, an indicator unit having a motor connected to the actuating contact and two or more indicator elements each having an indicator mechanism, a driving connection with the motor by which it can be separately driven, a magnet, a circuit therefor, means operated by the magnet for stopping the mechanism at any indicating position, contacts in the circuit for each position, means operating with the mechanism for closing a contact at each position, and connections from each of the mechanically closed contacts to one of the contacts in the group of position contacts at the operating board.

6. In an electric indicating system, an operating board having two or more groups of indicator position contacts, an indicator actuating contact, and means for closing a position contact in each set to the current source, an indicator unit having a motor connected to the actuating contact and two or more indicator elements each having an indicator mechanism, a friction driving connection with the motor, a magnet, a circuit therefor, means operated by the magnet for stopping the mechanism at any indicating position, contacts in the circuit for each position, means operating with the mechanism for closing a contact at each position and connections from each of the mechanically closed contacts to one of the contacts in the group of position contacts at the operating board.

7. In an electric indicating system, an operating board having a plurality of sets of indicator selecting contacts, two or more sets of groups of indicator position contacts, a plurality of indicator actuating contacts, means for closing a set of indicator selecting contacts to one side of the current source, means for closing an indicator position contact in each set to the other side of the current source, and means for closing an actuating contact to the current source, a bulletin having a plurality of indicating units, each unit having a motor connected to an actuating contact and two or more indicating elements, each element having an indicator mechanism, a driving connection with the motor by which it can be separately driven, a magnet, a circuit therefor connected with an indicator selecting contact, means operated by the magnet for stopping the mechanism at any indicating position, contacts in the circuit for each position connected with corresponding contacts of the elements of other units at the bulletin, means operating with the mechanism for closing a contact at each position, and a connection from each of the corresponding contacts to one of the position contacts at the operating board.

8. In an electric indicating system, an operating board having a plurality of groups of indicator position contacts arranged in a lattice, means for concurrently closing a pair of contacts in each group, a plurality of contact closers corresponding to the plurality of groups of indicator position contacts each having normally open contacts in series with the indicator position contacts of its corresponding group for closing to one side of the source of current, normally open indicator selecting contacts for closing to the other side of the source of current, a bulletin having a plurality of indicating elements, each element having an indicator mechanism, means for driving the mechanism, a magnet, a circuit therefor connected with an indicator selecting contact, means operated by the magnet for stopping the mechanism at any indicating position, contacts in the circuit for each position connected with corresponding contacts of the other elements at the bulletin and a connection from each of the corresponding contacts to a position contact in each group at the operating board.

9. In an electric indicating system an operating board having an actuating contact and two groups of indicator position contacts, each of which is interconnected in a number of sets, unitary means for connecting a contact in one of the sets of one group with a contact in one of the sets of the other group in any permutation of the sets, and an indicator unit having two indicator elements each having an indicator mechanism, a magnet, a circuit therefor, means operated by the magnet for stopping the mechanism at any indicating position, contacts in the circuit for each position means operating with the mechanism for closing a contact at each position and connections from each of the mechanically closed contacts to one of the sets of interconnected contacts at the operating board.

10. In an electric time indicating system an operating board having an actuating contact, sets of ten-minute indicator contact segments, interconnected segments alternating therewith, sets of unit-minute indicator buttons located at the adjacent corners of the segments, a plug for connecting together a button and two adjacent segments in any permutation of the sets of segments and buttons, and an indicator unit having ten-minute and unit-minute indicator elements each having an indicator mechanism, a magnet, a circuit therefor, means operated by the magnet for stopping the mechanism at any indicating position, contacts in the circuit for each position, means operating with the mechanism for closing a contact at each position, connections from the contacts of the ten-minute indicator mechanism to the sets of ten-minute indicator contact segments and connections from the contacts of the unit-minute mechanism to the sets of unit-minute indicator buttons at the operating board.

Signed by me at New York, N. Y., this sixth day of September, 1912.

SAMUEL W. BALCH.

Witnesses:
 THOMAS EWING, Jr.,
 HUGH H. SENIOR.